UNITED STATES PATENT OFFICE 2,140,237

WELDING WIRE FOR CARBON ELECTRODE ARC WELDING

Franz Leitner, Kapfenberg, Steiermark, Austria

No Drawing. Application March 9, 1937, Serial No. 129,922. In Austria and Germany March 27, 1936

2 Claims. (Cl. 219—8)

In recent years arc welding with carbon electrodes has grown more and more important. Thin-sheet welding is generally carried out without any filler rods; welding on structural work, however, with thicker sections to be joined filler material is necessary. Such filler material may, according to the special nature of the joint be given various forms (round-, square-section or any other profile).

Up to now, in connection with carbon electrode arc welding ordinary iron wires have been used which, however, bring about the disadvantage that the structure of such a seam is not of the desired homogeneity so that only poor strength figures can be arrived at. But particularly to be pointed out is the unsatisfactory form of the welded seam produced with ordinary iron rods, for as a rule it is impossible with such a wire to lay a fillet weld with a smooth gradual transition from parent to filler material; furthermore, surface irregularities of the weld are clearly disclosed.

Fusion welding with carbon electrodes is bound to quite different conditions than any other kind of fusion welding.

With oxyacetylene method for example, the temperature of the source of heat is considerably lower than with carbon electrode arc welding. In addition the gas flame provides quite a different metallurgical influence upon the filler material, because the flame is so adjusted that oxydation is negligible. Moreover, the gas too produced by the flame shields the weld metal from contact with the ambient atmosphere.

Carbon electrode arc welding is bound to substantially higher temperatures and a principally different kind of flame; therefore, the metallurgical conditions too are of quite another nature which affect the fluid metal. Because of these different metallurgical conditions and in particular in view of the desired quality of the welded seam, only filler material of a certain composition can ensure best physical properties and a favorable form of the welded seam.

With metal electrode arc welding the arc is struck by the metal rod itself or by the material used for example for coating the rod. The material melts within the arc, is given a considerable overheating i. e., again another metallurgical procedure and again calling for another chemical composition of the filler material to ensure especial properties.

It is known that in particular on structural work subjected to alternating loads the form of the seam is considered to be a deciding factor i. e., fatigue strength figures drop very low with unfavorable forms of the welded seam.

Welding wires for carbon electrode welding in a composition as disclosed in this invention produce a sort of welded seam and surface that ensure particularly high alternating strength of the welded construction. A wide series of experiments led to the discovery that such favorable results can be achieved only with welding wires the chemical composition of which falls within the limits of this invention.

Welding wires showing the aforesaid advantages had for example the following composition:

| | Per cent |
|---|---|
| Carbon, about | 0.15 to 0.45 |
| Manganese, about | .20 to 3 |
| Silicon, about | .25 to 1 |
| Sulphur, about | 0.03 to 0.06 |
| Phosphorus, about | 0.015 to 0.045 |

Adding up to 0.80% titanium, up to 0.50% aluminum or up to 1.2% zirconium either individually or in combinations within the stated limits has yet further improved the physical properties; and this improvement can for another step be augmented by the presence of up to 8.0% nickel, up to 0.30% magnesium, up to 5% chromium, up to 3% tungsten, up to 2% molybdenum, up to 2% cobalt, up to 0.40% vanadium, up to 1.5% tantalum, and up to 2% copper, making it possible to adjust the composition of the welding wire as far as this can be done to the physical properties of the parent metal. The composition of a welding wire to meet such high requirements has been:

| | Per cent |
|---|---|
| Carbon, about | 0.10 |
| Manganese, about | 0.80 |
| Silicon, about | 0.30 |
| Chromium, about | 0.50 |
| Nickel, about | 2.50 |
| Titanum, about | 0.10 |
| Aluminum, about | 0.10 |

Carbon electrode arc welding provides a more economical procedure of welding joints than it has been possible with either the ordinary type of electric arc or oxyacetylene method. Advantageously this way of welding can be applied also for automatic welding. By using filler material as claimed in this invention all primordial conditions are fully met with to enable producing welds of the necessary physical quality also with carbon electrodes. This smoothens the path for a general introduction of this type of electrode also for high-class welded joints.

There are welding wires for oxyacetylene and electric arc welding known in the art possessing more or less similar alloyings with the wire composition claimed in this invention. Such wires have, however, neither been applied for carbon electrode arc welding, which proceeds under quite different conditions, nor have they been recognized to be applicable for such purpose.

I claim:

1. A welding wire for carbon electrode arc welding containing up to 0.45% carbon, 0.25 to 1% silicon, 0.20 to 3% manganese, not more than 0.06% sulphur, not more than 0.045% phosphorus, at least one metal selected from the group consisting of up to 1.2% zirconium, up to 0.50% aluminum, up to 0.80% titanium, up to 0.40% vanadium, up to 1.50% tantalum and up to 0.30% magnesium, and the reminder iron.

2. A welding wire for carbon electrode arc welding containing up to 0.45% carbon, 0.25 to 1% silicon, 0.20 to 3% manganese, not more than 0.06% sulphur, not more than 0.045% phosphorus, at least one metal selected from the group consisting of up to 1.2% zirconium, up to 0.50% aluminum, up to 0.80% titanium, up to 0.40% vanadium, up to 1.50% tantalum and up to 0.30% magnesium, and at least one metal selected from the group consisting of up to 8% nickel, up to 2% molybdenum, up to 3% tungsten, up to 5% chromium, up to 2% cobalt and up to 2% copper and the remainder iron.

FRANZ LEITNER.